United States Patent [19]
Kaufman et al.

[11] Patent Number: 6,033,596
[45] Date of Patent: Mar. 7, 2000

[54] MULTI-OXIDIZER SLURRY FOR CHEMICAL MECHANICAL POLISHING

[75] Inventors: Vlasta Brusic Kaufman, Geneva; Shumin Wang, Naperville, both of Ill.

[73] Assignee: Cabot Corporation, Boston, Mass.

[21] Appl. No.: 08/800,562

[22] Filed: Feb. 18, 1997

Related U.S. Application Data

[63] Continuation-in-part of application No. 08/718,937, Sep. 24, 1996.

[51] Int. Cl.⁷ .............................. C09K 13/00; C09K 13/06
[52] U.S. Cl. .......................................... 252/79.1; 252/79.4
[58] Field of Search .................................. 252/79.1, 79.4

[56] References Cited

U.S. PATENT DOCUMENTS

| | | | |
|---|---|---|---|
| 3,296,141 | 1/1967 | Lieb et al. | 252/79.3 |
| 3,385,682 | 5/1968 | Lowen . | |
| 3,668,131 | 6/1972 | Banush et al. . | |
| 4,671,851 | 6/1987 | Beyer et al. | 156/645 |
| 4,789,648 | 12/1988 | Chow et al. | 437/225 |
| 4,818,333 | 4/1989 | Michaud . | |
| 4,910,155 | 3/1990 | Cote et al. | 437/8 |
| 4,944,836 | 7/1990 | Beyer et al. | 156/645 |
| 4,954,459 | 9/1990 | Avanzino et al. | 437/225 |
| 4,956,313 | 9/1990 | Cote et al. | 437/203 |
| 4,992,135 | 2/1991 | Doan | 156/636 |
| 5,137,544 | 8/1992 | Medellin | 51/308 |
| 5,157,876 | 10/1992 | Medellin | 51/281 R |
| 5,173,438 | 12/1992 | Sandhu | 437/63 |
| 5,209,816 | 5/1993 | Yu et al. | 156/636 |
| 5,244,534 | 9/1993 | Yu et al. | 156/636 |
| 5,256,402 | 10/1993 | Prencipe et al. . | |
| 5,340,370 | 8/1994 | Cadien et al. | 51/308 |
| 5,354,490 | 10/1994 | Yu et al. | 251/79.1 |
| 5,389,194 | 2/1995 | Rostoker et al. | 156/636 |
| 5,391,258 | 2/1995 | Brancaleoni et al. | 156/636 |
| 5,407,526 | 4/1995 | Danielson et al. . | |
| 5,476,606 | 12/1995 | Brancaleoni et al. | 252/79.1 |
| 5,527,423 | 6/1996 | Neville et al. | 156/636.1 |
| 5,540,810 | 7/1996 | Sandhu et al. . | |
| 5,575,837 | 11/1996 | Kodama et al. | 106/3 |

FOREIGN PATENT DOCUMENTS

| | | |
|---|---|---|
| 2847267 | 5/1980 | Germany . |
| 151937 | 9/1983 | India . |
| 48-052638 | 7/1973 | Japan . |
| 59-196385 | 11/1984 | Japan . |
| 63-229262 | 9/1988 | Japan . |
| WO 96/16436 | 5/1996 | WIPO . |

*Primary Examiner*—Thi Dang
*Assistant Examiner*—George Goudreau

[57] ABSTRACT

A chemical mechanical polishing slurry comprising a first oxidizer of urea hydrogen peroxide, a second oxidizer, an organic acid, and an abrasive, and a method for using the chemical mechanical polishing slurry to remove titanium, titanium nitride, and an aluminum alloy containing layer from a substrate.

3 Claims, No Drawings

MULTI-OXIDIZER SLURRY FOR CHEMICAL MECHANICAL POLISHING

This is a Continuation-In-Part of U.S. patent application Ser. No. 08/718,937 filed on Sep. 24, 1996.

BACKGROUND OF THE INVENTION

1. Field of the Invention

This invention concerns a chemical mechanical polishing slurry including at least two oxidizers, one of which is urea hydrogen peroxide. The chemical mechanical polishing slurry is useful for polishing metal layers and thin-films associated with semiconductor manufacturing. More particularly this invention concerns a chemical mechanical polishing slurry that is especially adapted for polishing multiple metal layers and thin-films where one of the layers or films is comprised of aluminum or an aluminum containing alloy and another layer or thin film is comprised of titanium or a titanium containing alloys or compounds such as titanium nitride.

2. Description of the Art

Integrated circuits are made up of millions of active devices formed in or on a silicon substrate. The active devices, which are initially isolated from one another, are interconnected to form functional circuits and components. The devices are interconnected through the use of well-known multilevel interconnections. Interconnection structures normally have a first layer of metallization, an interconnection layer, a second level of metallization, and sometimes a third and subsequent level of metallization. Interlevel dielectrics such as doped and undoped silicon dioxide ($SiO_2$), are used to electrically isolate the different levels of metallization in a silicon substrate or well. The electrical connections between different interconnection levels are made through the use of metallized vias. U.S. Pat. No. 4,789,648, which is incorporated herein by reference, describes a method for preparing multiple metallized layers and metallized vias in insulator films. In a similar manner, metal contacts are used to form electrical connections between interconnection levels and devices formed in a well. The metal vias and contacts may be filled with various metals and alloys including titanium (Ti), titanium nitride (TiN), tantalum (Ta), aluminum copper (Al-Cu), aluminum silicon (Al-Si), copper (Cu), tungsten (W), and combinations thereof. The metal vias and contacts generally employ an adhesion layer such as titanium nitride (TiN) and/or titanium (Ti) to adhere the metal layer to the $SiO_2$ substrate. At the contact level, the adhesion layer acts as a diffusion barrier to prevent the filled metal and $SiO_2$ from reacting.

In one semiconductor manufacturing process, metallized vias or contacts are formed by a blanket metal deposition followed by a chemical mechanical polish (CMP) step. In a typical process, via holes are etched through an interlevel dielectric (ILD) to interconnection lines or to a semiconductor substrate. Next, a thin adhesion layer such as titanium nitride and/or titanium is generally formed over the ILD and is directed into the etched via hole. Then, a metal film is blanket deposited over the adhesion layer and into the via hole. Deposition is continued until the via hole is filled with the blanket deposited metal. Finally, the excess metal is removed by chemical mechanical polishing, (CMP) to form metal vias. Processes for manufacturing and/or CMP of vias are disclosed in U.S. Pat. Nos. 4,671,851, 4,910,155 and 4,944,836.

In a typical chemical mechanical polishing process, the substrate is placed in direct contact with a rotating polishing pad. A carrier applies pressure against the backside of the substrate. During the polishing process, the pad and table are rotated while a downward force is maintained against the substrate back. An abrasive and chemically reactive solution, commonly referred to as a "slurry" is applied to the pad during polishing. The slurry initiates the polishing process by chemically reacting with the film being polished. The polishing process is facilitated by the rotational movement of the pad relative to the substrate as slurry is provided to the wafer/pad interface. Polishing is continued in this manner until the desired film on the insulator is removed. The slurry composition is an important factor in the CMP step. Depending on the choice of the oxidizing agent, the abrasive, and other useful additives, the polishing slurry can be tailored to provide effective polishing to metal layers at desired polishing rates while minimizing surface imperfections, defects and corrosion and erosion. Furthermore, the polishing slurry may be used to provide controlled polishing selectivities to other thin-film materials used in current integrated circuit technology such as titanium, titanium nitride and the like.

Typically CMP polishing slurries contain an abrasive material, such as silica or alumina, suspended in an oxidizing, aqueous medium. For example, U.S. Pat. No. 5,244,523 to Yu et al. reports a slurry containing alumina, hydrogen peroxide, and either potassium or ammonium hydroxide that is useful to remove tungsten at predictable rates with little removal of the underlying insulating layer. U.S. Pat. No. 5,209,816 to Yu et al. discloses a slurry comprising perchloric acid, hydrogen peroxide and a solid abrasive material in an aqueous medium that is useful for polishing aluminum. U.S. Pat. No. 5,340,370 to Cadien and Feller discloses a tungsten polishing slurry comprising approximately 0.1M potassium ferricyanide, approximately 5 weight percent silica and potassium acetate. Acetic acid is added to buffer the pH at approximately 3.5.

U.S. Pat. No. 4,789,648 to Beyer et al. discloses a slurry formulation using alumina abrasives in conjunction with sulfuric, nitric, and acetic acids and deionized water. U.S. Pat. Nos. 5,391,258 and 5,476,606 disclose slurries for polishing a composite of metal and silica which includes an aqueous medium, abrasive particles and an anion which controls the rate of silica removal. Other polishing slurries for use in CMP applications are described in U.S. Pat. No. 5,527,423 to Neville et al., U.S. Pat. No. 5,354,490 to Yu et al., U.S. Pat. No. 5,340,370 to Cadien et al., U.S. Pat. No. 5,209,816 to Yu et al., U.S. Pat. No. 5,157,876 to Medellin, U.S. Pat. No. 5,137,544 to Medellin, and U.S. Pat. No. 4,956,313 to Cote et al.

It has been recognized that CMP slurries that are used to polish multiple metal layers in a single step typically exhibit a low polishing rate towards at least one of the metal layers. As a result, the polishing step is lengthened or operated at aggressive polishing conditions that can cause undesirable erosion of the $SiO_2$ layer and recessing of the metal vias and/or metal lines. Such recessing causes a non-planar via layer or metal line layer to be formed which impairs the ability to print high resolution lines during subsequent photolithography steps and can cause the formation of voids or open circuits in the formed metal interconnections. Additionally, recessing increases when over polishing is used to ensure complete removal of the titanium, titanium nitride, and aluminum films across the surface of a wafer. Thus, a need remains for CMP slurries which reliably polish a plurality of metal layers including a titanium layer in an integrated circuit. Accordingly, a new CMP polishing slurry that polishes titanium at a higher rate is needed to overcome the present substrate manufacturing reliability issues imposed by the current CMP polishing slurries.

SUMMARY OF THE INVENTION

The present invention is directed to a single chemical mechanical polishing slurry that includes urea hydrogen peroxide. In addition to acting as an oxidizer, the urea hydrogen peroxide is more stable than hydrogen peroxide alone and it help stabilize other slurry components such as additional oxidizers.

In addition, the chemical mechanical polishing slurry is able to polish aluminum alloy, titanium, and titanium nitride layers at acceptable rates and has a high insulator polishing selectivity while exhibiting low polishing selectivities towards titanium, and titanium nitride.

Furthermore, this invention is directed to methods for using a single chemical mechanical polishing slurry to polish a plurality of metal layers in an integrated circuit.

In one embodiment, this invention is an aqueous chemical mechanical polishing slurry. The chemical mechanical polishing slurry comprises an abrasive, urea hydrogen peroxide, and a second oxidizer. In addition, the chemical mechanical polishing slurry may include at least one organic acid.

In another embodiment, this invention is an aqueous chemical mechanical polishing slurry. The chemical mechanical polishing slurry comprises alumina, from about 1.5 to about 30.0 weight percent urea hydrogen peroxide, from about 0.2 to about 10.0 weight percent second oxidizer, and from about 0.5 to about 5.0 weight percent succinic acid. Furthermore, the pH of the chemical mechanical polishing slurry ranges from about 2.0 to about 8.0.

In still another embodiment, this invention is a method for polishing a substrate. The method includes admixing an abrasive, from about 1.5 to about 30.0 weight percent urea hydrogen peroxide, from about 0.2 to about 10.0 weight percent of a second oxidizer, from about 0.5 to about 5.0 weight percent of at least one organic acid, and deionized water to give a chemical mechanical polishing slurry. Next, the chemical mechanical polishing slurry is applied to the substrate and at least a portion of a titanium layer, at least a portion of a titanium nitride adhesion layer and at least a portion of an aluminum alloy containing layer associated with the substrate are removed by bringing a pad into contact with the substrate and moving the pad in relation to the substrate.

DESCRIPTION OF THE CURRENT EMBODIMENT

The present invention relates to a chemical mechanical polishing slurry that comprises an abrasive and at least two oxidizers wherein one of the oxidizers is urea hydrogen peroxide. The chemical mechanical polishing slurry is used to polish at least one metal layer associated with a substrate selected from the group including integrated circuits, thin films, multiple level semiconductors, and wafers. In particular, the chemical mechanical polishing slurry of this invention has been found to exhibit excellent polishing selectivities when used to polish a substrate including titanium, titanium nitride, and aluminum alloy containing layers in a single step, multiple metal layer chemical mechanical polishing process.

Before describing the details of the various preferred embodiments of this invention, some of the terms that are used herein will be defined. The chemical mechanical polishing slurry, ("CMP slurry"), is a useful product of this invention that comprises at least two oxidizing agents, an abrasive, an organic acid, and other optional ingredients. The CMP slurry is useful for polishing a multiple level metallization which may include but are not limited to semi-conductor thin-films, integrated circuit thin-films, and for any other films and surfaces where CMP processes are useful. The terms "aluminum" and "aluminum containing alloys" are used interchangeably herein as it is within the understanding of one of skill in the art that in order to improve electromigration properties of aluminum, most "aluminum" containing metallization layers are actually comprised of an aluminum containing alloy, such as Al-Cu.

The oxidizing agents useful in the chemical mechanical polishing slurry are incorporated into a CMP slurry to aid in oxidizing the multiple metal layers to their corresponding oxide, hydroxide, or ions. For example, in the present invention, the oxidizing agents may be used to oxidize a metal layer to its corresponding oxide or hydroxide, e.g., titanium to titanium oxide, tungsten to tungsten oxide, copper to copper oxide, and aluminum to aluminum oxide. The oxidizing agents of this invention are useful when incorporated into a polishing slurry to polish metals and metal based components including titanium, titanium nitride, tantalum, copper, tungsten, aluminum, and aluminum alloys such as aluminum/copper alloys, and various mixtures and combinations thereof by mechanically polishing the metals to remove the respective oxide layer.

The CMP slurry of this invention includes at least two oxidizers. The first oxidizer is urea hydrogen peroxide. The urea hydrogen peroxide may be present in the overall chemical mechanical polishing slurry in an amount ranging from about 1.5 to about 30.0 weight percent. It is preferred that urea hydrogen peroxide is present in the slurry in an amount ranging from about 3.0 to about 17.0 weight percent and most preferably from about 5.0 to about 12.0 weight percent.

The CMP slurry of this invention includes a second oxidizer. The second oxidizer should be capable of polishing aluminum and aluminum containing alloy metal layers with good selectivities. Preferably, the second oxidizer is selected from dipersulfate and monopersulfate compounds and more preferably, is ammonium persulfate. The second oxidizer may be present in the chemical mechanical polishing slurry in an amount ranging from about 0.2 to about 10.0 weight percent. More preferably, the second oxidizer will be present in the chemical mechanical polishing slurry in an amount ranging from about 2.0 to about 8.0 weight percent with a range of from about 3.0 to about 5.0 being most preferred.

The CMP slurry of this invention includes an abrasive. The abrasive is typically a metal oxide abrasive. The metal oxide abrasive may be selected from the group including alumina, titania, zirconia, germania, silica, ceria and mixtures thereof. The CMP slurry of this invention preferably includes from about 1.0 to about 9.0 weight percent or more of an abrasive. It is more preferred, however, that the CMP slurry of this invention includes from about 3.0 to about 6.0 weight percent abrasive.

The metal oxide abrasive may be produced by any techniques known to those skilled in the art. Metal oxide abrasives can be produced using any high temperature process such as sol-gel, hydrothermal or, plasma process, or by processes for manufacturing fumed or precipitated metal oxides. Preferably, the metal oxide is a fumed or precipitated abrasive and, more preferably it is a fumed abrasive such as fumed silica or fumed alumina. For example, the production of fumed metal oxides is a well-known process which involves the hydrolysis of suitable feedstock vapor (such as aluminum chloride for an alumina abrasive) in a flame of hydrogen and oxygen. Molten particles of roughly spherical shapes are formed in the combustion process, the diameters of which are varied through process parameters. These molten spheres of alumina or similar oxide, typically referred to as primary particles, fuse with one another by undergoing collisions at their contact points to form branched, three dimensional chain-like aggregates. The force necessary to break aggregates is considerable and often considered irreversible. During cooling and collecting, the aggregates undergo further collision that may result in some mechanical entanglement to form agglomerates. Agglomerates are thought to be loosely held together by van der Waals forces and can be reversed, i.e., de-agglomerated, by proper dispersion in a suitable media.

Precipitated abrasives may be manufactured by conventional techniques such as by coagulation of the desired particles from an aqueous medium under the influence of high salt concentrations, acids or other coagulants. The particles are filtered, washed, dried and separated from residues of other reaction products by conventional techniques known to those skilled in the art.

A preferred metal oxide will have a surface area, as calculated from the method of S. Brunauer, P. H. Emmet, and I. Teller, J. Am. Chemical Society, Volume 60, Page 309 (1938) and commonly referred to as BET, ranging from about 5 $m^2/g$ to about 430 $m^2/g$ and preferably from about 30 $m^2/g$ to about 170 $m^2/g$. Due to stringent purity requirements in the IC industry the preferred metal oxide should be of a high purity. High purity means that the total impurity content, from sources such as raw material impurities and trace processing contaminants, is typically less than 1% and preferably less than 0.01% (i.e., 100 ppm).

In this preferred embodiment, the metal oxide abrasive consists of metal oxide aggregates having a size distribution less than about 1.0 micron, a mean aggregate diameter less than about 0.4 micron and a force sufficient to repel and overcome the van der Waals forces between abrasive aggregates themselves. Such metal oxide abrasive has been found to be effective in minimizing or avoiding scratching, pit marks, divots and other surface imperfections during polishing. The aggregate size distribution in the present invention may be determined utilizing known techniques such as transmission electron microscopy (TEM). The mean aggregate diameter refers to the average equivalent spherical diameter when using TEM image analysis, i.e., based on the cross-sectional area of the aggregate. By force is meant that either the surface potential or the hydration force of the metal oxide particles must be sufficient to repel and overcome the van der Waals attractive forces between the particles.

In another preferred embodiment, the metal oxide abrasive may consist of discrete, individual metal oxide particles having a primary particle diameter less than 0.4 micron (400 nm) and a surface area ranging from about 10 $m^2/g$ to about 250 $m^2/g$.

Preferably, the metal oxide abrasive is incorporated into the aqueous medium of the polishing slurry as a concentrated aqueous dispersion of metal oxides, which aqueous dispersion of metal oxide abrasives typically ranges from about 3% to about 45% solids, and preferably between 10% and 20% solids. The aqueous dispersion of metal oxides may be produced utilizing conventional techniques, such as slowly adding the metal oxide abrasive to an appropriate media, for example, deionized water, to form a colloidal dispersion. The dispersion is typically completed by subjecting it to high shear mixing conditions known to those skilled in the art. The pH of the slurry may be adjusted away from the isoelectric point to maximize colloidal stability.

The CMP slurry of this invention may further include an organic acid. A wide range of conventional organic acids, salts of organic acids, and mixtures thereof are useful in the CMP slurry of the present invention to enhance the selectivity to oxide polishing rate, such as monofunctional acids, di-functional acids, hydroxyl/carboxylate acids, chelating, non-chelating acids, and their salts. Preferably, the organic acid is selected from the group of acetic acid, adipic acid, butyric acid, capric acid, caproic acid, caprylic acid, citric acid, glutaric acid, glycolic acid, formic acid, fumaric acid, lactic acid, lauric acid, malic acid, maleic acid, malonic acid, myristic acid, oxalic acid, palmitic acid, phthalic acid, propionic acid, pyruvic acid, stearic acid, succinic acid, tartaric acid, valeric acid and derivatives, including salts thereof.

The organic acid or salt should be present in the final CMP slurry, individually or in combination with other organic acids or salts, in an amount sufficient to enhance the oxide selectivity without detrimentally effecting the stability of the CMP slurry. As such, the organic acid is typically present in the slurry from about 0.05% to 15% by weight, and preferably in a range between 0.5% and 5.0% by weight. Examples of chemical mechanical polishing slurries including organic acids and salts thereof are disclosed in U.S. patent application Ser. No. 08/644,509 which is incorporated herein by reference. A preferred organic acid is succinic acid. Succinic acid has been found to promote passivation of aluminum and it also inhibits the removal of the dielectric layer.

Other well known polishing slurry additives may be incorporated into the chemical mechanical polishing slurry of this invention. One type of optional additives are inorganic acids and/or salts thereof which may be added to the polishing slurry to further improve or enhance the polishing rate of the barrier layers in the wafer, such as titanium and tantalum. Useful inorganic additives include sulfuric acid, phosphoric acid, nitric acid, ammonium salts, potassium salts, sodium salts or other cationic salts of sulfates and phosphates.

In order to promote stabilization of the polishing slurry including oxidizing agents against settling, flocculation and decomposition, a variety of optional additives, such as surfactants, stabilizers, or dispersing agents, can be used. If a surfactant is added to the CMP slurry, then it can be an anionic, cationic, nonionic, or amphoteric surfactant or a combination of two or more surfactants can be employed. Furthermore, it has been found that the addition of a surfactant may be useful to improve the within-wafer-non-uniformity (WIWNU) of the wafers, thereby improving the surface of the wafer and reducing wafer defects. Non-limiting examples of preferred stabilizers useful in the CMP slurry of this invention include but are not limited to phosphonic acids such as aminotri(methylenephosphonic) acid, 1-hydroxyethylidene-4-diphosphonic acid, hexamethylenediaminetetramethylene phosphonic acid, and diethylenetetramine pentamethylenephosphonic acid. One or more stabilizers may be present in the CMP slurry of this invention in an amount that is sufficient to produce measurable improvements in slurry stability. A phosphonic acid stabilizer will generally be present in the slurry in an amount ranging from about 100 ppm to about 5.0 weight percent. The addition of one or more phosphonic acids to the CMP slurry of this invention may also inhibit metallic corrosion.

In general, the amount of additive such as a surfactant that may be used in the present invention should be sufficient to achieve effective stearic stabilization of the slurry and will typically vary depending on the particular surfactant selected and the nature of the surface of the metal oxide abrasive. For example, if not enough of a selected surfactant is used, it will have little or no effect on stabilization. On the other hand, too much surfactant in the CMP slurry may result in undesirable foaming and/or flocculation in the slurry. As a result, stabilizers such as surfactants should generally be present in a range between about 0.001% and 10% by weight. Furthermore, the additive may be added directly to the slurry or treated onto the surface of the metal oxide abrasive utilizing known techniques. In either case, the amount of additive is adjusted to achieve the desired concentration in the polishing slurry.

It is desirable to maintain the pH of the CMP slurry of this invention within a range of from about 2.0 to about 8, and preferably between from about 3.5 to about 6 in order to facilitate control of the CMP process. Specifically, it has been observed that the metal surface film passivation capability of the CMP slurry of this invention is compromised at high pH's, e.g., greater than 8. Likewise, slurry handling problems and substrate polishing quality problems are encountered when the pH of the CMP slurry of this invention is too low, e.g., less than 2. The pH of the CMP slurry of this invention may be adjusted using any known acid, base, or amine. However, the use of an acid or base that contains no metal ions, such as ammonium hydroxide and amines, or nitric, phosphoric, sulfuric, or organic acids are preferred to avoid introducing undesirable metal components into the CMP slurry of this invention.

The chemical mechanical polishing slurry of this invention has been found to have a high titanium (Ti) polishing rate as well as a high polishing rates towards titanium nitride (TiN) an aluminum containing layer and especially towards an Al-Cu metal layer. In addition, the chemical mechanical polishing slurry exhibits desirable low polishing rates towards the dielectric insulating layer.

One important application for the chemical mechanical polishing slurry of this invention is as a chemical mechanical polish for thin layer films comprising titanium, aluminum and aluminum containing alloys such as Al-Cu. In such a polishing application, the single polishing slurry is effective to polish titanium, titanium nitride, and aluminum alloy containing layers. The CMP slurry of this invention preferably exhibit a Al-Cu to titanium [Al-Cu:Ti] polishing selectivity and a Al-Cu to TiN [Al-Cu:TiN] polishing selectivity of from about 2:1 to about 1:2 and preferably from about 1:1.25 to about 1.25:1. At the same time the CMP slurry of this invention exhibits a very low dielectric ($SiO_2$) polishing rate and preferably an $SiO_2$ polishing rate less than 40 Å/min.

The CMP slurry may be produced using conventional techniques known to those skilled in the art. Typically, the oxidizing agent and any optional additives, are mixed into the aqueous medium, such as deionized or distilled water, at predetermined concentrations under low shear conditions until such components are completely dissolved in the medium. A concentrated dispersion of the metal oxide abrasive, such as fumed alumina, is added to the medium and diluted to the desired loading level of abrasive in the final CMP slurry.

The CMP slurries of the present invention may be supplied as one package system (oxidizing agents, abrasive, and additives in a stable aqueous medium). To avoid possible CMP slurry degradation, however, it is preferred that at least a two package system is used where the first package comprises the first oxidizer and the second package comprises the second oxidizer. The remaining components, the abrasive, the organic acid, and any optional additives may be placed in either the first container, the second container or in a third container. When the first oxidizer is urea hydrogen peroxide, however, both oxidizers in dry solid form may be placed in a first container while the remaining aqueous ingredients are placed in a second container.

The components in the first container or second container may be in dry form while the components in the corresponding container are in the form of an aqueous dispersion. For example, the first container may comprise the first oxidizer in aqueous form while the second container comprises an aqueous dispersion of the abrasive the second oxidizer and the organic acid. Alternately, the first container may comprise an aqueous dispersion of an abrasive and the first oxidizer while the second container may comprise the organic acid and the second oxidizer in aqueous form. Other two-container combinations of the ingredients of the CMP slurry of this invention are within the knowledge of one having ordinary skill in the art.

A multi-package CMP slurry system may be used with any standard polishing equipment appropriate for use on the desired metal layer of the wafer. The multi-package system includes one or more CMP slurry components in aqueous or dry form in two or more containers. The multi-package system is used by combining the components from the various containers in the desired amounts to give a CMP slurry comprising at least two oxidizing agents, an abrasive, and an organic acid in amounts described above.

The CMP slurry of the present invention does not significantly increase the silicon dioxide polishing rate above about 40 Å/min. However, the CMP slurry of this invention significantly increases the polishing rate of titanium or titanium nitride while maintaining a high polishing rate towards aluminum and aluminum containing alloys such as Al-Cu. Thus, the CMP slurry of this invention is effective in controlling polishing selectivities of titanium, titanium nitrite and Al-Cu. The polishing slurry of the present invention may be used during the various stages of semiconductor integrated circuit manufacture to provide effective polishing at desired polishing rates while minimizing surface imperfections and defects.

EXAMPLES

We have discovered that a CMP slurry including two oxidizers is capable of polishing a multiple metal layer comprising titanium, titanium nitride, and Al-Cu at high rates while exhibiting an acceptable low polishing rate towards the dielectric layer.

The following examples illustrate preferred embodiments of this invention as well as preferred methods for using compositions of this invention.

Example 1

In this example, CMP polishing was accomplished using two CMP slurries including 4.0 weight percent ammonium persulfate, 3.0 weight percent succinic acid, 5.0 weight percent of a fumed alumina abrasive from SEMI-SPERSE® W-A355 dispersion sold by the Microelectronics Materials Division of Cabot Corporation, in Aurora, Ill., and either 0 or 3.0 weight percent hydrogen peroxide with the remainder of the slurry consisting of deionized water. The slurry was adjusted to a pH of 5.0 with ammonium hydroxide.

The CMP slurry was applied to Ti coated blanket wafers having a thickness of 2000 Å. The wafers were placed in an IPEC 472 tool manufactured by IPEC Planar. The wafers were subjected to 5 psi down force, a table speed of 45 rpm, and a spindle speed of 60 rpm. The CMP slurry was applied to a XMGH 1158 pad manufactured by Rodel, Inc. at a rate of 200 ml/min.

The titanium removal rate for the CMP slurry containing no hydrogen peroxide was 8.6 nm/min and the Al-Cu/titanium selectivity was above 23. The titanium removal rate for the CMP slurry containing 3.0 weight percent hydrogen peroxide was 200 nm/min and the titanium/Al-Cu selectivity was 1:1. In both tests the Al-Cu removal rate was about 200 nm/min.

Example 2

This example studies the effect of varying solution pH on the aluminum polishing rates and Ti, TiN, and $SiO_2$ selectivities of a CMP slurry of this invention. This example used a CMP slurry of this invention having the following composition; 4.0 weight percent ammonium persulfate; 3.0 weight percent succinic acid; 3.0 weight percent hydrogen peroxide; 5.0 weight percent alumina abrasive (W-A355) with the remainder being deionized water. The pH of the slurry was adjusted using ammonium hydroxide to give two slurries; the first with a pH of 3.5 and the second with a pH of 5.0.

The CMP slurry was applied to Al, Ti, TiN, and $SiO_x$ blanket coated wafers. The wafers were placed in a IPEC 472 tool and polished using a 5 psi down force, a table speed of 45 rpm, and a spindle speed of 60 rpm. The CMP slurry was applied to a XMGH1158 pad at a rate of 200 ml/min. Table 1, below summarizes the results of this example.

TABLE 1

|   | pH 3.5 | pH 5.0 |
|---|---|---|
| Al removal rate: | 350 nm/min | 600 nm/min |
| Al WIWNU | 7.6% | 14% |
| Sel. to Ti | 1.72:1 | 1.61:1 |
| Sel. to TiN | 1.79:1 | 3.9:1 |
| Sel. to $SiO_2$ | 88:1 | n/m |
| Dishing, 50 μm* | 57 nm | 40.5 nm |
| Dishing, 128 μm** | 198 nm | 164 nm |
|   | pH 3.5 | pH 5.0 |
| Erosion | 65 nm | 54 nm |

*the result is based on initial feature depth of 750 nm covered with 1.5 μm of AlCu.
**the result is based on initial feature depth of 750 nm covered with 0.8 μm of AlCu.

The polishing results, set forth in Table 1, above, clearly show that the CMP slurry of this invention is useful over a wide pH range.

Example 3

This example investigates the effect of the addition of phosphonic acids to a CMP slurry of this invention on titanium dissolution. A CMP slurry consisting of 4.0 weight percent ammonium persulfate, 3.0 weight percent succinic acid, 3.0 weight percent hydrogen peroxide, 5.0 weight percent alumina abrasive (WA-355), and deionized water was used in this example. The CMP slurry, with and without the addition of small amounts of aminotri (methylenephosphonic acid)) was introduced into an electrochemical cell, and the Ti dissolution rate of the freshly abraded surface was evaluated by electrochemical techniques five minutes after abrasion had ceased. The results, which show that the phosphonic acid inhibits Ti dissolution are set forth in Table 2 immediately below:

TABLE 2

| Slurry pH | % Phosphonic Acid | Ti Dissolution Rate (Å/min) |
|---|---|---|
| 3.5 | 0 | 3.4 |
| 5.0 | 0 | 6.0 |
| 5.0 | 0.1 | 3.0 |
| 5.0 | 0.5 | 1.3 |
| 5.0 | 1.0 | 1.0 |
| 8.05 | 0 | 68 |
| 8.05 | 1.0 | 3.4 |

Example 4

This Example compares the effectiveness of urea hydrogen peroxide and hydrogen peroxide as useful CMP oxidizers. Specifically, this Example compares the stability over time of the two oxidizers.

Four slurries having the following compositions were prepared in an aqueous medium (deionized water). Each slurry was prepared using SEMI-SPERSE® W-A355 alumina dispersion and diluted to 5 weight percent alumina with deionized water.

Slurry A: 5% alumina, 3% hydrogen peroxide [HP], 3% succinic acid, original pH=3.50.

Slurry B: 5% alumina, 8.5% urea-hydrogen peroxide [UHP] (which corresponds to about 3.0 weight percent aqueous $H_2O_2$), 3% succinic acid, original pH=3.55.

Slurry C: 5% alumina, 3% hydrogen peroxide [HP], 4% ammonium persulfate, 3% succinic acid, original pH=4.00.

Slurry D: 5% alumina, 8.5% urea-hydrogen peroxide [UHP] (which corresponds to about 3.0 weight percent aqueous $H_2O_2$), 4% ammonium persulfate, 3% succinic acid, original pH=4.00.

Slurries A and B were allowed to stand at room temperature, over a seven week period. Samples of slurry A and B were periodically analyzed for pH and titrated with acid to determine percentage of active peroxide. The results are reported in Table 3 below.

TABLE 3

Stability Study of Slurries A and B

| | Active $H_2O_2$% | | pH | |
|---|---|---|---|---|
| | Slurry A HP | Slurry B UHP | Slurry A HP | Slurry B UHP |
| 0 weeks | 3.35 | 3.28 | 3.50 | 3.55 |
| 1 weeks | | 3.30 | | 3.48 |
| 2 weeks | 2.85 | | 3.62 | |
| 3 weeks | | 3.24 | | 3.52 |
| 5 weeks | | 3.12 | | 3.49 |
| 7 weeks | 1.82 | | 3.54 | |
| Average change/week | −0.22 | −0.03 | 0.006 | −0.012 |

The test results indicate that the active peroxide in the slurry including hydrogen peroxide degrades at a much faster rate than the slurry including urea hydrogen peroxide. The pH stability of both slurries are similar.

The peroxide activity, the activity of the persulfate oxidizer, and the pH of slurries C and D were evaluated as above. The results of the stability evaluation of slurries C and D are reported in Table 4, below.

TABLE 4

Stability Study of Slurries of C and D

| | Active $H_2O_2$% | | Persulfate % | | pH | |
|---|---|---|---|---|---|---|
| | Slurry C | Slurry D | Slurry C | Slurry D | Slurry C | Slurry D |
| 0 days | 3.10 | 3.21 | 4.27 | 4.11 | 4.00 | 4.00 |
| 1 days | 3.13 | | 4.09 | | 3.74 | |
| 2 days | 3.08 | | 3.73 | | 3.61 | |
| 3 days | 2.96 | 3.21 | 3.15 | 3.89 | 3.26 | 3.90 |
| 4 days | 2.90 | 3.14 | 2.69 | 4.16 | 2.84 | 3.86 |
| 5 days | | 3.15 | | 4.18 | | 3.86 |
| 6 days | | 3.09 | | 4.06 | | 3.81 |
| 7 days | | 3.06 | | 4.02 | | 3.77 |
| 11 days | | 3.06 | | 3.98 | | 3.68 |
| Average change/day | −0.05 | −0.01 | −0.40 | −0.01 | −0.29 | −0.03 |

The stability data reported in Table 4 confirms that the activity of a slurry comprising urea hydrogen peroxide is more stable over time than a slurry containing hydrogen peroxide. Furthermore, the results reported in Table 4 also show that urea hydrogen peroxide stabilizes the second oxidizer and significantly inhibits its degradation over time. Thus, urea hydrogen peroxide acts as both an oxidizer and as a stabilizer in a CMP slurry including at least two oxidizers allowing slurries incorporating urea hydrogen peroxide to be prepared many days prior to use without loss of oxidizer activity.

Example 5

The polishing performance of slurries C and D were evaluated according to the method set forth in Example 1 above. The polishing results are set forth in Table 5 below.

TABLE 5

Polishing Results of Slurry C and D

| | Slurry C | Slurry D |
|---|---|---|
| Al rate (average) | 4922 | 5195 |
| TiN rate (average) | >3724 | >3767 |
| Sel. To TiN | <1.32 | <1.38 |
| Ti Rate (average) | >2754 | >2772 |
| Sel. To Ti | <1.79 | <1.87 |
| Oxide rate (average) | 97 | 67 |
| Sel. To Oxide | 50.9 | 77.5 |

The polishing results show that both slurries are effective at polishing various metal layers. Furthermore, Slurry D, incorporating urea hydrogen peroxide exhibits a desirable higher selectivity towards the oxide layer than hydrogen peroxide containing Slurry C.

The results of these examples demonstrate that a CMP slurry including a first oxidizer and a second oxidizer is useful, over a wide range of pH's in polishing multiple layers of metallization in a single polishing step. The results also demonstrate that the addition of a stabilizer to a CMP slurry of this invention inhibits corrosion of a metal layer of a metal substrate.

While the present invention has been described by means of specific embodiments, it will be understood that modifications may be made without departing from the spirit of the invention. The scope of the invention is not to be considered as limited by the description of the invention set forth in the specification and examples, but rather as defined by the following claims.

What we claim is:

1. A chemical mechanical polishing slurry comprising:

from about 1.0 to about 9.0 weight percent alumina;

from about 1.5 to about 30.0 weight percent urea hydrogen peroxide;

from about 0.2 to about 10.0 weight percent ammonium persulfate; and from about 0.5 to about 5.0 weight percent succinic acid.

2. The chemical mechanical polishing slurry of claim 1 including from about 3.0 to about 6.0 weight percent, alumina from about 5.0 to about 12.0 weight percent urea hydrogen peroxide, from about 3.0 to about 5.0 weight percent ammonium persulfate, and from about 0.5 to about 5.0 weight percent succinic acid.

3. The chemical mechanical polishing slurry of claim 1 having a selectivity of from about 1:2 to about 2:1.

* * * * *